P. FRANTZ.
TRACK FOR DOOR HANGERS.
APPLICATION FILED JUNE 8, 1912.
Reissued Dec. 17, 1912. 13,497.
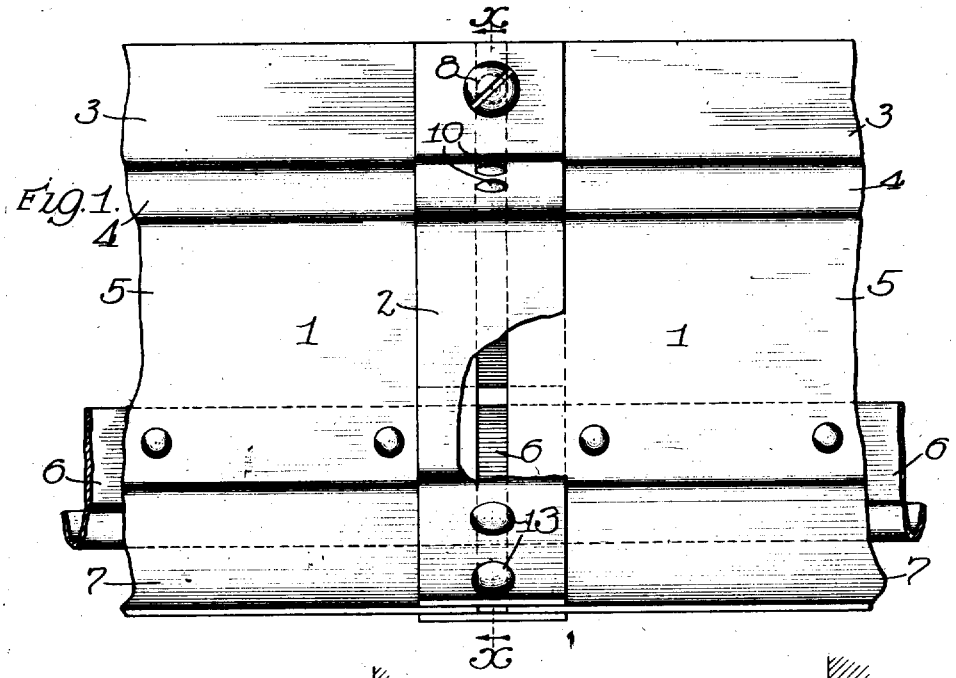
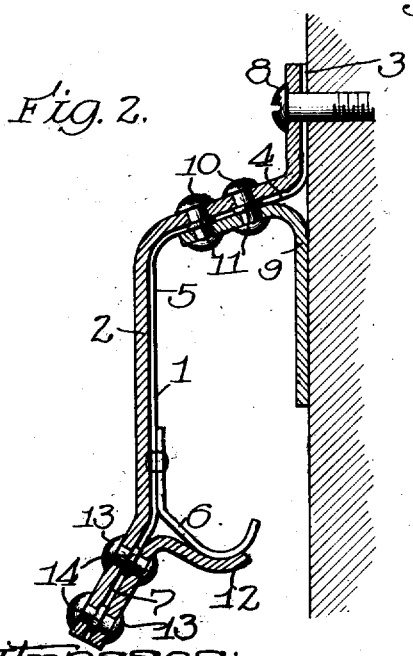
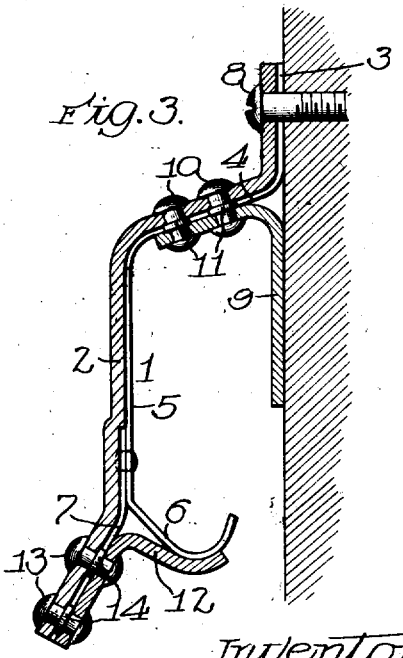
Witnesses:
H. Thomas Jr.
P. Burkhardt.
Inventor:
Peter Frantz
By Arthur F. Durand
Attorney

UNITED STATES PATENT OFFICE.

PETER FRANTZ, OF STERLING, ILLINOIS, ASSIGNOR TO FRANTZ MANUFACTURING CO., OF STERLING, ILLINOIS, A CORPORATION OF ILLINOIS.

TRACK FOR DOOR-HANGERS.

13,497. Specification of Reissued Letters Patent. Reissued Dec. 17, 1912.

Original No. 993,161, dated May 23, 1911, Serial No. 602,430. Application for reissue filed June 8, 1912. Serial No. 702,576.

*To all whom it may concern:*

Be it known that I, PETER FRANTZ, a citizen of the United States of America, and a resident of Sterling, in the county of Whiteside and State of Illinois, have invented certain new and useful Improvements in Tracks for Door-Hangers, of which the following is a specification.

This invention relates to that type of overhead tracks for sliding doors, in which an extended horizontal wrought metal shell having an inturned or lateral flange at its lower edge provides a track for the usual tandem wheels of the hanger. And the present improvement has for its object to provide a simple and efficient structural formation and combination of parts whereby strength to resist flexure of the track with lightness and economy of material is attained, and with which standard lengths of the track can be coupled together in a ready and effective manner to provide a track of any desired extent, all as will hereinafter more fully appear.

In the accompanying drawings:—Figure 1 is a detail front elevation of a track embodying the present invention, and illustrating the coupling between standard lengths of the track. Fig. 2 is a transverse section on line *x*—*x*, Fig. 1. Fig. 3 is a similar view of a modification.

Similar numerals of reference indicate like parts in the different views.

Referring to the drawings, 1 represents portions of two adjoining lengths of the track coupled together by a coupling band or member 2 hereinafter described in detail. In the present construction each length of track comprises an upper vertical attaching web 3, from the lower end of which extends outwardly an inclined shed portion or web 4, and from the outer end of said shed depends a vertical web 5, the lower end of which terminates in an inturned and preferably trough shaped web 6 which constitute the longitudinal track for the usual tandem wheels of a door hanger, and said vertical web 5 also terminates in an outwardly extending inclined web 7, which is adapted to very efficiently brace and support the track against ordinary stress in actual use. It is within the province of this part of the present invention to make the inclined bracing web 7 integral with the other webs 3, 4 and 5, and secure the web 6 thereto as a separate part, as illustrated in Fig. 2, or to make the webs 3, 4, 5 and 6 integral, and secure the web 7 thereto as a separate part, as illustrated in Fig. 3.

The coupling band 2 above referred to is formed from a flat bar of metal bent to the outer contour of the webs 3, 4, 5 and 7 above described, and adapted to closely fit the outer surface of the same, as shown in Figs. 2 and 3.

8 is a screw passing through the upper end of the coupling band 2, to effect an attachment of the track to the face of a wall or the like.

9 is an angle bracket arranged in the interior of the track and provided with a vertical member adapted to bear against the wall, and an inclined top member that rests beneath and supports the inclined shed portion or web 4 of the track. Said bracket is secured to the coupling band 2 in spaced relation corresponding to the thickness of the web 4, by rivets 10 and interposed washers or collars 11, as shown.

12 is a supporting bracket arranged underneath the track and formed with an inclined upper arm which rests beneath and supports the web 6, and with a lower inclined arm that is secured to an adjacent portion of the coupling band 2, in spaced relation corresponding to the thickness of the web 7, by rivets 13 and interposed washers or collars 14 as shown.

With the described arrangement of the coupling band 2, and brackets 9 and 12, sockets are provided for the reception of the adjoining ends of track lengths, and in my preferred construction, as shown in Fig. 1, the webs 3, 4, 5 and 7 are separated a distance equal to the diameter of the attaching screw 8, or washers 11 and 14, while the web 6, which constitutes the track surface, projects beyond the other webs to abut against the next adjacent web 6, and provide a continuous track surface.

Having thus fully described my said invention, what I claim as new and desire to secure by Letters Patent, is:

1. A track member formed with an upper vertical web, an inclined web extending outwardly from the lower end of said vertical web, an intermediate vertical web depending from the outer end of said inclined web, an inturned web extending laterally from the lower end of said intermediate web, and an outwardly inclined web depending from the lower end of said intermediate vertical web, substantially as set forth, and a supporting member provided with means for engaging the outer surface of the track, the inner surface of the said lower inclined web, and the bottom of said inturned web.

2. A track comprising in combination a pair of track lengths each formed with an upper vertical web, an inclined web extending outwardly from the lower end of said vertical web, an intermediate vertical web depending from the outer end of said inclined web, an inturned web extending laterally from the lower end of said intermediate vertical web and an outwardly inclined web depending from the lower end of said intermediate vertical web, a coupling band formed to fit the exterior of the track lengths, and supporting brackets secured in separated relation to said coupling band to form receiving sockets for the end of the track lengths, substantially as set forth.

3. A sheet metal door hanger track comprising track sections provided with end edges, said sections disposed end to end and having an interior track surface in the bottom thereof, and a supporting member provided with means for removably holding the ends of said sections, and for spacing apart the said end edges of the sections, and means for securing the said member in place.

4. A sheet metal door hanger track comprising track sections provided with end edges, said sections disposed end to end, a supporting member provided with means for removably engaging the ends of said sections, and for spacing apart the said end edges of said sections, said track having a depending web composed of said lower portions and engaged inside and outside by said means, and means for securing the said member in place.

5. A sheet metal door hanger track comprising track sections disposed end to end, and a supporting member provided with means for removably engaging the ends of said sections, and for spacing the sections apart endwise, said means including a bracket secured upon the inside of the lower end portion of said member, with space between for the thickness of the sheet metal, and the upper end of said bracket being bent inward to engage the bottom of the track.

6. A sheet metal door hanger track comprising track sections disposed end to end, and a supporting member provided with means for removably engaging the ends of said sections, and for spacing the sections apart endwise, said means including a bracket secured upon the inside of the lower end portion of said member, with space between for the thicknesses of the sheet metal, and the upper end of said bracket being bent inward to engage the bottom of the track, together with rivets inserted through the said member and bracket, said rivets having portions which space the member and bracket apart.

7. A sheet metal door hanger track comprising track sections disposed end to end provided with separated end edges, and a supporting member provided with means for removably engaging the ends of said sections between said end edges, said sections providing a continuous track surface interiorly thereof.

8. A sheet metal door hanger track comprising an attaching web, a track web, an inclined lower web, and a device for supporting the track, having means for engaging both the inner and outer surface of said lower web.

9. A sheet metal door hanger track comprising an attaching web, a track web, an inclined lower web, a device for supporting the track, having means for engaging both the inner and outer surface of said lower web, and means for engaging the bottom of the said track web.

10. A sheet metal door hanger track comprising track sections disposed end to end provided with separated end edges, and a supporting device provided with means for removably engaging the ends of said sections between said end edges, one or more of said sections having an end portion which engages the next section to provide a continuous track surface.

11. A sheet metal door hanger track comprising track sections disposed end to end provided with separated end edges, and a supporting device provided with means for removably engaging the ends of said sections between said end edges, one or more of said sections having an end portion which engages the next section to provide a continuous track surface, said end portion being formed by the end of a longitudinal web riveted to the inside of the section.

Signed at Sterling, Illinois, this 5th day of June, 1912.

PETER FRANTZ.

Witnesses:
MELVILLE HAGAN,
W. K. PALMER.